United States Patent
Lin et al.

(10) Patent No.: US 11,233,455 B2
(45) Date of Patent: Jan. 25, 2022

(54) VARIABLE-FREQUENCY POWER CONTROLLER

(71) Applicant: INNO-TECH CO., LTD., Taipei (TW)

(72) Inventors: Shu-Chia Lin, Taipei (TW); Tsu-Huai Chan, Taipei (TW); Chih-Feng Lin, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 14 days.

(21) Appl. No.: 16/993,360

(22) Filed: Aug. 14, 2020

(65) Prior Publication Data

US 2021/0384835 A1    Dec. 9, 2021

(30) Foreign Application Priority Data

Jun. 5, 2020  (TW) .................................. 109118900

(51) Int. Cl.
| | | |
|---|---|---|
| *H02M 3/335* | (2006.01) | |
| *H02M 1/08* | (2006.01) | |
| *H02M 1/00* | (2006.01) | |

(52) U.S. Cl.
CPC ..... *H02M 3/33507* (2013.01); *H02M 1/0035* (2021.05); *H02M 1/08* (2013.01)

(58) Field of Classification Search
CPC ........... H02M 3/33507; H02M 1/0032; H02M 1/0035; H02M 1/08; H02M 1/0054
See application file for complete search history.

(56) References Cited

U.S. PATENT DOCUMENTS

| | | | | |
|---|---|---|---|---|
| 2010/0219802 | A1* | 9/2010 | Lin | H02M 3/33507 323/284 |
| 2014/0078790 | A1* | 3/2014 | Lin | H02M 3/33507 363/21.16 |
| 2014/0301116 | A1* | 10/2014 | Zhang | H02M 3/33507 363/21.15 |
| 2015/0244274 | A1* | 8/2015 | Fahlenkamp | H02M 3/33523 363/21.15 |
| 2017/0012538 | A1* | 1/2017 | Barrenscheen | H02M 3/33507 |
| 2018/0262096 | A1* | 9/2018 | Hsu | H02M 3/33523 |
| 2019/0363635 | A1* | 11/2019 | Lin | H02M 3/33592 |
| 2021/0257914 | A1* | 8/2021 | Cacciotto | H02M 3/33523 |

\* cited by examiner

*Primary Examiner* — Alex Torres-Rivera
(74) *Attorney, Agent, or Firm* — Lin & Associates Intellectual Property, Inc.

(57) ABSTRACT

Disclosed is a variable-frequency power controller. The controller includes a power pin, a ground pin, a driving pin, a voltage sensing pin, and a loading voltage sensing pin, and is in collocation with a rectification unit, an inductor unit, a switch unit, an output unit, a voltage sensing unit, and a loading voltage sensing unit to implement a variable-frequency power control of power conversion. The controller performs one of the burst mode, valley switch mode, quasi-resonance (QR) mode, conduction mode, and peak loading mode based on a wide range of loading level. In particular, the loading level covered by the present invention includes the ultra-light, light, middle, full, and over-heavy loading, and the features of power saving, low switching loss, operation safety are thus achieved. Further, any over design employed to meet the wide range of loading level is prevented.

10 Claims, 3 Drawing Sheets

VARIABLE-FREQUENCY POWER CONTROLLER

CROSS-REFERENCE TO RELATED APPLICATION

This application claims the priority of Taiwanese patent application No. 109118900, filed on Jun. 5, 2020, which is incorporated herewith by reference.

BACKGROUND OF THE INVENTION

1. Field of the Invention

The present invention generally relates to a variable-frequency power controller, and more specifically to a variable-frequency power controller implementing a variable-frequency power control of power conversion for a primary side feedback or a secondary side feedback by performing the burst mode, valley switch mode, quasi-resonance mode, conduction mode, or peak loading mode based on a wide range of loading level including the ultra-light, light, middle, full, and over-heavy loading, thereby achieving the features of power saving, low switching loss, operation safety, and further avoiding any over design.

2. The Prior Arts

In the current field of switching power supply, Pulse Width Modulation (PWM) is one of the most widely used schemes because of high efficiency of power conversion. However, the application circuit for PWM power conversion needs to collocate with high performance inductive elements such as transformers.

In general, the traditional power controller generates a PWM driving signal to drive a switch unit like power transistor connected to a transformer so as to periodically turn on/off the switch unit for conducting or cutting off the current. The PWM frequency of the PWM driving signal is usually preset to be a fixed value. To cover various loading, some manufacturers have developed specific power controllers provided with the PWM frequency adjustable.

In short, as the loading is lighter, the PWM frequency is lower, and if the loading becomes heavier, the PWM frequency has to increase to a higher value so as to enhance output power.

Additionally, some devices like motors will cause instantaneous peak loading with considerably high power while powering on, and a large transformer is needed to avoid saturation and short-circuit, thereby protecting peripheral components from damage. Since the power of normal operation is much less than the power required by the peak loading, the large transformer becomes an over design for most of the time in operation, and is not cost effective.

For example, an instantaneous loading current may fast increases up to 10 A from OA at the beginning of powering on, but the period of time is extremely short such as several mini second, and then the loading current fast drops down to a normal value like 5 A. It is obvious that the transformer designed for meeting the instantaneous loading current due to safety has one time over design for the normal operation, the circuit board needs a larger area to accommodate the large transformer, and the total weight greatly increases. As a result, it is inconvenient and impractical for application and the overall coast increases.

Furthermore, the power controller in the prior arts fails to effectively integrate the burst mode, valley switch mode, quasi-resonance mode, conduction mode, and peak loading mode, or are not able to select the optimal operation mode for the changeable loading. In other words, the specific design for lower loading is not safe for the heavier loading, or the design for heavier loading is not optimal for the lower loading. Further, the design for lower or heavier loading is still not optimal to meet the peak loading. It is thus difficult to cover the wide range of loading for overall efficiency of power conversion.

Therefore, it is greatly needed to provide a new power controller implementing a variable-frequency power control of power conversion for a primary side feedback or a secondary side feedback by performing the burst mode, valley switch mode, quasi-resonance mode, conduction mode, or peak loading mode based on a wide range of loading level including the ultra-light, light, middle, full, and over-heavy loading so as to achieve the features of power saving, low switching loss, operation safety, and further avoid any over design, thereby overcoming the above problems in the prior arts.

SUMMARY OF THE INVENTION

The primary object of the present invention is to provide a variable-frequency power controller in collocation with a rectification unit, a power unit, an inductor unit, a switch unit, an output unit, a current sensing unit, and a loading voltage sensing unit to implement a variable-frequency power control of power conversion. The controller comprises a power pin, a ground pin, a driving pin, a voltage sensing pin, and a loading voltage sensing pin, specifically performs one of the burst mode, valley switch mode, quasi-resonance (QR) mode, conduction mode, and peak loading mode based on a wide range of loading level, and further employs the loading voltage sensing unit to connect the loading voltage sensing pin so as to construct a secondary side feedback.

Another object of the present invention is to provide a variable-frequency power controller comprising a power pin, a ground pin, a driving pin, a voltage sensing pin, and an auxiliary winding sensing pin. The controller is in collocation with a rectification unit, a power unit, an inductor unit, a switch unit, an output unit, a current sensing unit, and an auxiliary winding sensing unit to implement a variable-frequency power control of power conversion. Specifically, the controller performs one of the burst mode, valley switch mode, quasi-resonance (QR) mode, conduction mode, and peak loading mode based on a wide range of loading level, and further employs the auxiliary winding sensing unit to connect the auxiliary winding sensing pin so as to construct a primary side feedback.

Further, the above switch unit is implemented by a Metal-Oxide-Semiconductor (MOS) transistor, a Gallium Nitride field effect transistor (GaN FET), or a silicon carbide (SiC)-MOSFET, and the inductor unit comprises at least one inductor such as winding.

More specifically, the power pin is connected to the power unit for receiving an input power, the ground pin is connected to a ground level, the driving pin is connected to a gate of the switch unit, the voltage sensing pin is connected to a source of the switch unit and an end of the current sensing unit, and another end of the current sensing unit is connected to the ground level and generates a current sensing voltage.

Further, the rectification unit receives and converts an external input power into a rectification power, and the power unit receives the external input power to generate the input power through regulation.

The inductor unit comprises a primary side winding and a secondary side winding coupled to each other for providing a function of transformer. An end of the primary side winding is connected to the rectification unit for receiving the rectification power, another end of the primary side winding is connected to a drain of the switch unit, an end of the current sensing unit is connected to a source of the switch unit, another end of the current sensing unit is connected to the ground level, and the output unit is connected to an end of the secondary side winding for generating the output power to supply a load connected to the output unit.

For the secondary side feedback, another end of the secondary side winding is connected to the ground level, the loading voltage sensing unit is connected to the output unit for receiving the output power and generating a loading sensing voltage, and the loading voltage sensing pin is connected to the current sensing unit for receiving the loading sensing voltage.

For the primary side feedback, the auxiliary winding sensing pin is connected to the ground level through the auxiliary winding sensing unit, and the auxiliary winding sensing unit is coupled to the primary side winding and the secondary side winding for generating an auxiliary winding voltage through induction with a primary side voltage of the primary side winding and a secondary side voltage of the secondary side winding. Specifically, the auxiliary winding voltage serves as a loading sensing voltage corresponding to the loading level of the load, and is received by the auxiliary winding sensing pin. No matter the loading sensing voltage comes from the primary side feedback or the secondary side feedback, the variable-frequency power controller employs the loading sensing voltage to implement variable-frequency power control for power conversion.

More specifically, one aspect of the above variable-frequency power controller is intended to generate and transfer a driving signal to the driving pin for driving the switch unit to turn on or off. The driving signal is substantially a PWM signal with a variable PWM frequency.

The variable-frequency power controller has a first loading voltage, a second loading voltage, a third loading voltage, and a fourth loading voltage preset for comparing the loading sensing voltage to determine the loading level. The first loading voltage is less than the second loading voltage, the second loading voltage is less than the third loading voltage, and the third loading voltage is less than the fourth loading voltage.

Moreover, the variable-frequency power control is performed by the variable-frequency power controller to dynamically adjust the PWM frequency based on the loading level, and specifically comprises the burst mode, valley switch mode, quasi-resonance mode, conduction mode, and peak loading mode.

Further, when the loading sensing voltage is not higher than the first loading voltage, the loading level is considered as ultra-light loading, the variable-frequency power controller is set in the burst mode, and the PWM frequency is kept to a first frequency.

If the loading sensing voltage is higher than the first loading voltage and not higher than the second loading voltage, the loading level is considered as light loading, the variable-frequency power controller is switched to the valley switch mode, and the PWM frequency is increased to a second frequency from the first frequency as the loading sensing voltage increases. The second frequency is greater than the first frequency. Specifically, if the switch unit is turned off and the current sensing voltage decreases to a target valley after a preset number of valleys, the switch unit is turned on. As well known, the valley is the lowest local value of the current sensing voltage, which oscillates and damps during the switch unit being turned off.

If the loading sensing voltage is higher than the second loading voltage and not higher than the third loading voltage, the loading level is considered as middle loading, the variable-frequency power controller is in the quasi-resonance (QR) mode, and the PWM frequency is decreased to a third frequency from the second frequency. The third frequency is between the first frequency and the second frequency.

When the loading sensing voltage is higher than the third loading voltage and not higher than the fourth loading voltage, the loading level is considered as full loading, the variable-frequency power controller is switched to the conduction mode, and the PWM frequency is kept to the third frequency.

Finally, if the loading sensing voltage is higher than the fourth loading voltage, the loading level is considered as over-heavy loading, the variable-frequency power controller is set in the peak loading mode, and the PWM frequency is increased to a fourth frequency from the third frequency as the loading sensing voltage increases. The fourth frequency is greater than the third frequency.

Overall, the variable-frequency power controller of the present invention does not only perform one of the burst mode, valley switch mode, quasi-resonance mode, conduction mode, and peak loading mode based on the loading level to cover the ultra-light, light, middle, full, and over-heavy loading so as to achieve effective power-saving, low switching loss, operation safety, and avoid over design, but also select the optimal operation modes according to the voltage level of the external input power to screen off the unnecessary modes so as to further greatly improve efficiency and meet various applications.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
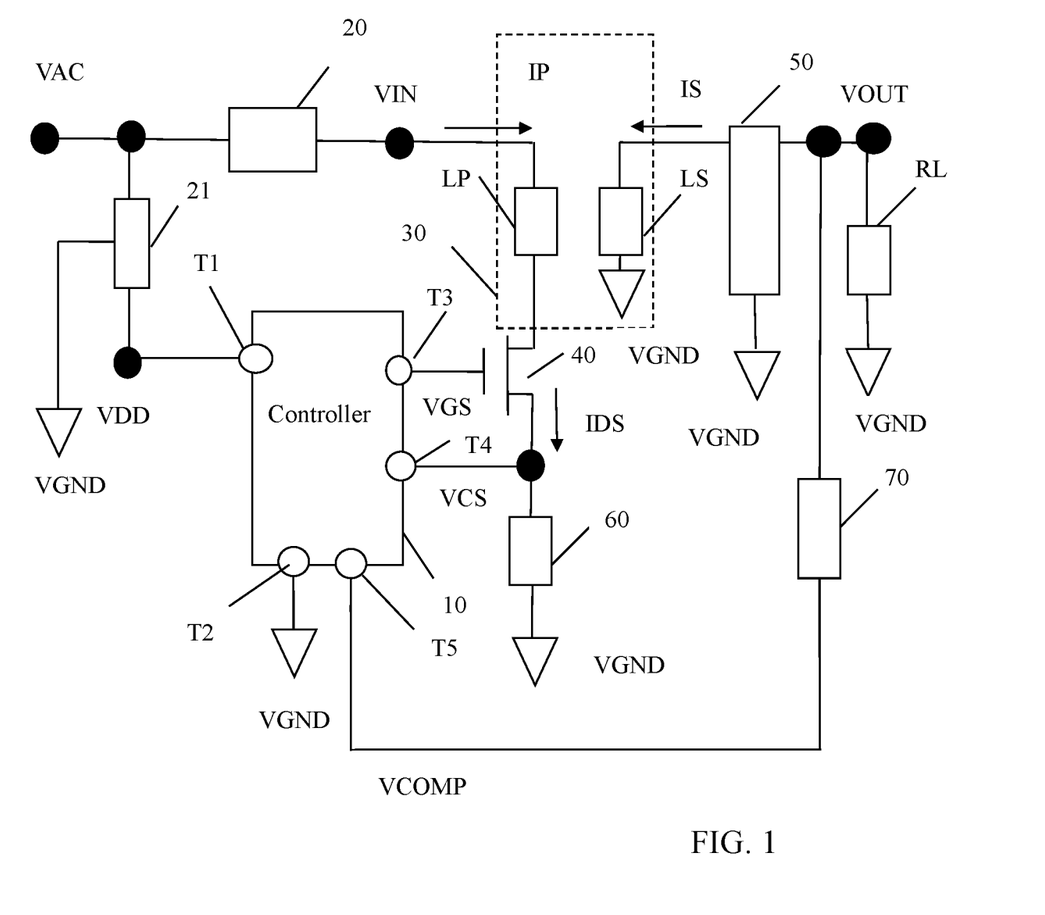
FIG. 1 is a view showing the variable-frequency power controller according to the first embodiment of the present invention.
Figure 2:
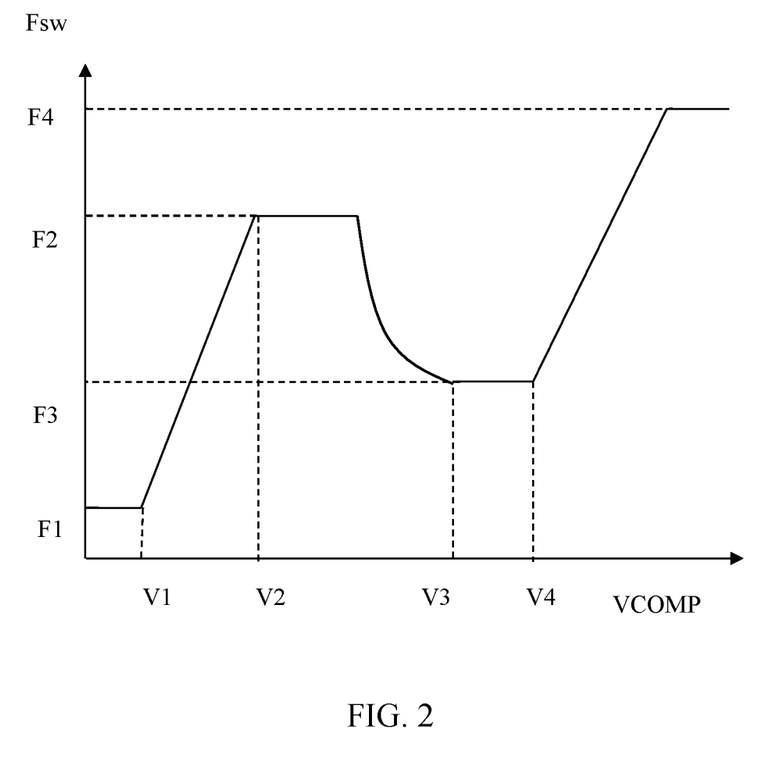
FIG. 2 is a view showing the operation waveform of the PWM frequency vs the loading sensing voltage for the variable-frequency power controller according to the first embodiment of the present invention.

Please refer to FIGS. 1 and 2. FIG. 1 is a view showing the variable-frequency power controller according to the first embodiment of the present invention, and FIG. 2 is a view showing the operation waveform of the pulse width modulation (PWM) frequency vs the loading sensing voltage for the variable-frequency power controller of the first embodiment. As shown in FIGS. 1 and 2, the variable-frequency power controller 10 according to the first embodiment is in collocation with a rectification unit 20, a power unit 21, an inductor unit 30, a switch unit 40, an output unit 50, a current sensing unit 60, and a loading voltage sensing unit 70 to implement a variable-frequency power control of power conversion. For example, the inductor unit 30 comprises at least one of inductor like winding, and the switch unit 40 is implemented by a Metal-Oxide-Semiconductor (MOS) transistor, a Gallium Nitride field effect transistor (GaN FET), or a silicon carbide (SiC)-MOSFET.

Specifically, the variable-frequency power controller 10 of the first embodiment comprises a power pin T1, a ground pin T2, a driving pin T3, a voltage sensing pin T4, and a loading voltage sensing pin T5. The power pin T1 is connected to the power unit 21 for receiving a power voltage VDD to supply the variable-frequency power controller 10 to operate, the ground pin T2 is connected to a ground level VGND, and the driving pin T3 is connected to a gate of the switch unit 40.

Additionally, the voltage sensing pin T4 is connected to a source of the switch 40 unit and an end of the current sensing unit 60, and another end of the current sensing unit 60 is connected to the ground level VGND and generates a current sensing voltage VCS. The loading voltage sensing pin T5 is connected to the loading voltage sensing unit 70.

Further, the rectification unit 20 receives and converts an external input power VAC into a rectification power VIN through rectification, and the power unit 21 receives the external input power VAC to generate the input power VDD through regulation.

Preferably, the inductor unit 30 comprises a primary side winding LP and a secondary side winding LS coupled to each other for providing a function of transformer. An end of the primary side winding LP is connected to the rectification unit 20 for receiving the rectification power VIN, another end of the primary side winding LP is connected to a drain of the switch unit 40, an end of the current sensing unit 60 is connected to a source of the switch unit 40, another end of the current sensing unit 60 is connected to the ground level VGND, the output unit 50 is connected to an end of the secondary side winding LS for generating the output power VOUT to supply a load RL connected to the output unit 50, and another end of the secondary side winding LS is connected to the ground level VGND. Further, a primary side current IP flows through the primary side winding LP, and a secondary side current IS is induced by the primary side current IP, and flows through the secondary side winding LS.

The loading voltage sensing unit 70 is connected to the output unit 50 for receiving the output power VOUT and generating a loading sensing voltage VCOMP. It is preferred that the loading voltage sensing unit 70 comprises a photo coupler, but it is not intended to limit the scope of the present invention. In other words, all the units able to sense the loading should be included by the present invention.

More specifically, one of the aspects provided by the variable-frequency power controller 10 is to generate and transfer a driving signal VGS to the driving pin T3 for driving the switch unit 40 to turn on or off. In particular, the driving signal VGS is substantially a PWM signal with a variable PWM frequency Fsw. Thus, the switch unit 40 is continuously, periodically, and fast turned on and off.

In addition, the variable-frequency power controller 10 as shown in FIG. 2 is provided with a first loading voltage V1, a second loading voltage V2, a third loading voltage V3, and a fourth loading voltage V4 for comparing the loading sensing voltage VCOMP to determine the loading level of the load RL The first loading voltage V1 is less than the second loading voltage V2, the second loading voltage V2 is less than the third loading voltage V3, and the third loading voltage V3 is less than the fourth loading voltage V4.

Further, the variable-frequency power control performed by the variable-frequency power controller 10 is primarily to adjust the variable PWM frequency Fsw based on the loading level so as to improve efficiency of power conversion, reduce switching loss, and particularly cope with the instantaneous peak loading such as avoiding malfunction of stopping the operation upon powering on.

Specifically, the above variable-frequency power control comprises the following steps. First, when the loading sensing voltage VCOMP is not higher than the first loading voltage V1, the loading level is considered as ultra-light loading, the variable-frequency power controller 10 is in the burst mode for power-saving, and the PWM frequency Fsw is kept to a first frequency F1. To further achieve power-saving, it is allowed to intermittently instead of continuously keep the PWM frequency Fsw if the demand of the load RL is just fulfilled. In other words, the PWM frequency Fsw kept to the first frequency F1 is allowed to only last for a specific period of lasting time, then stopped, and re-generated after a period of waiting time.

Further, if the loading sensing voltage VCOMP is higher than the first loading voltage V1 and not higher than the second loading voltage V2, the loading level is considered as light loading, the variable-frequency power controller 10 is in the valley switch mode. During the valley switch mode, if the switch unit 40 is turned off and the current sensing voltage VCS decreases to a target valley after a preset number of valleys like one or two valleys so as to effectively reduce switching loss. It is usually called zero-voltage-switch for the switching power conversion. At this time, the PWM frequency Fsw is linearly of non-linearly increased to a second frequency F2 from the first frequency F1 as the loading sensing voltage VCS increases, and the second frequency F2 is greater than the first frequency F1. Specifically, the number of valleys is preset by the variable-frequency power controller 10.

Since valley switch is one scheme in the prior arts, the detail operation is not explained hereinafter.

If the loading sensing voltage VCOMP is higher than the second loading voltage V2 and not higher than the third loading voltage V3, the loading level is considered as middle loading, the variable-frequency power controller 10 is in the quasi-resonance (QR) mode, and the PWM frequency Fsw is decreased to a third frequency F3 from the second frequency F2. The third frequency F3 is between the first frequency F1 and the second frequency F2.

The above QR mode is one scheme in the prior arts, and the detail operation is not explained hereinafter.

When the loading sensing voltage VCOMP is higher than the third loading voltage V3 and not higher than the fourth loading voltage V4, the loading level is considered as full loading, the variable-frequency power controller 10 is in the conduction mode, and the PWM frequency Fsw is kept to the third frequency F3. For example, the conduction mode is selected by the variable-frequency power controller 10 from one of a continuous conduction mode (CCM) and a discontinuous conduction mode (DCM) for optimal performance.

The continuous conduction mode and the discontinuous conduction mode are the schemes in the prior arts, and the detail operation is not explained hereinafter.

Finally, if the loading sensing voltage VCS is higher than the fourth loading voltage V4, the loading level is considered as over-heavy loading, the variable-frequency power controller 10 is in the peak loading mode, and the PWM frequency Fsw is increased to a fourth frequency F4 from the third frequency F3 as the loading sensing voltage VCS increases. The fourth frequency F4 is greater than the third frequency F3.

The above over-heavy loading is also called peak loading, and usually occurs upon powering on, and an instantaneous high current is generated, but lasts for only a very short period of time. As a result, the loading level may exceed several times of the rating. Or alternatively, the over-heavy loading may repeatedly happen at the application with electric motors like electrical hand tool, inkjet printer, hard disk drive under some specific circumstances. At this time, the power supply has to provide huge peak power, but for most of the operations, the normal power is much less than the peak power. It is obvious that the overall operation covers a wide range of power consumption. If the design of the power supply is designed according to the peak power, operation safety is assured, but an over-design issue is present for the normal operation and thus leads to higher cost for electric components, particularly like the transformer.

Take the above transformer as an illustrative example. Since a high current is needed to start working, the PWM frequency Fsw increases as the loading increases, and the peak current fast rises up. At this time, the magnetic flux density may exceed the rating due to the peak current to cause saturation for the transformer, and it results in serious short-circuit to cause the primary side current to greatly increase to damage the peripheral components.

As well known, the peak current changes reversely proportional to the PWM frequency Fsw, and it is effective to suppress and reduce the peak current if the PWM frequency Fsw is appropriately increased as the loading increases. As a result, a high output power is not only generated to supply the load RL for satisfying the need of the instantaneous power to start working, but the magnetic flux of the transformer at the very beginning is also greatly suppressed, and the size of the transformer is allowed to shrink for cost down, thereby presenting over-design.

Therefore, the present invention is specifically designed to increase the PWM frequency Fsw as the loading sensing voltage VCOMP increases in the peak loading mode so as to enhance output capability and meet the requirement for over-heavy loading.

Furthermore, the peak loading mode can be also designed to provide with a function of timer protection, and the driving signal VGS is then re-generated after a period of time. For example, the driving signal VGS lasts for a period of peak loading operation time preset in the peak loading mode, then stops (that is, stopping the driving signal VGS), and re-generates the driving signal VGS after a period of peak loading stop time preset like 1-70 seconds. Or alternatively, the function of protection is implemented by limiting the repeated number of the peak loading mode performed by the variable-frequency power controller 10 so as to constrain the whole effective operation time for the peak loading mode.

Overall, the variable-frequency power control of the present invention comprises the burst mode, valley switch mode, quasi-resonance mode, conduction mode, and peak loading mode to cover the ultra-light, light, middle, full, and over-heavy loading so as to achieve effective power-saving, low switching loss, operation safety, and avoid over design for meeting various applications with power-saving, low switching loss, and high operation safety. It is also optional in actual applications to select the best operation modes according to the actual situation like the voltage level of the external input power to screen off the unnecessary mode(s) so as to simplify the operation flow.

For example, the variable-frequency power controller 10 replaces the QR mode by the conduction mode if the external input power VAC is 90-180 Vac, and the variable-frequency power control only includes the burst mode, valley switch mode, conduction mode, and peak loading mode without the quasi-resonance mode.

Additionally, if the external input power VAC is 180-270 Vac, the conduction mode and the peak loading mode are replaced by the QR mode, and the variable-frequency power control only includes the burst mode, valley switch mode, and quasi-resonance mode without the conduction mode and the peak loading mode. Or alternatively, the peak loading mode is replaced by the conduction mode, and the variable-frequency power control only includes the burst mode, valley switch mode, quasi-resonance mode, and conduction mode without the peak loading mode.

It should be noted that the variable-frequency power controller 10 of the present invention can be also in collocation with an auxiliary winding (not shown) coupled with the secondary side winding LS to sense the output power VOUT and acquire the loading sensing voltage VCOMP, thereby removing the loading voltage sensing unit 70. The above scheme employing the auxiliary winding to replace the loading voltage sensing unit 70 is well known in the prior arts, and the related operation will be not explained in detail hereinafter.

Figure 3:
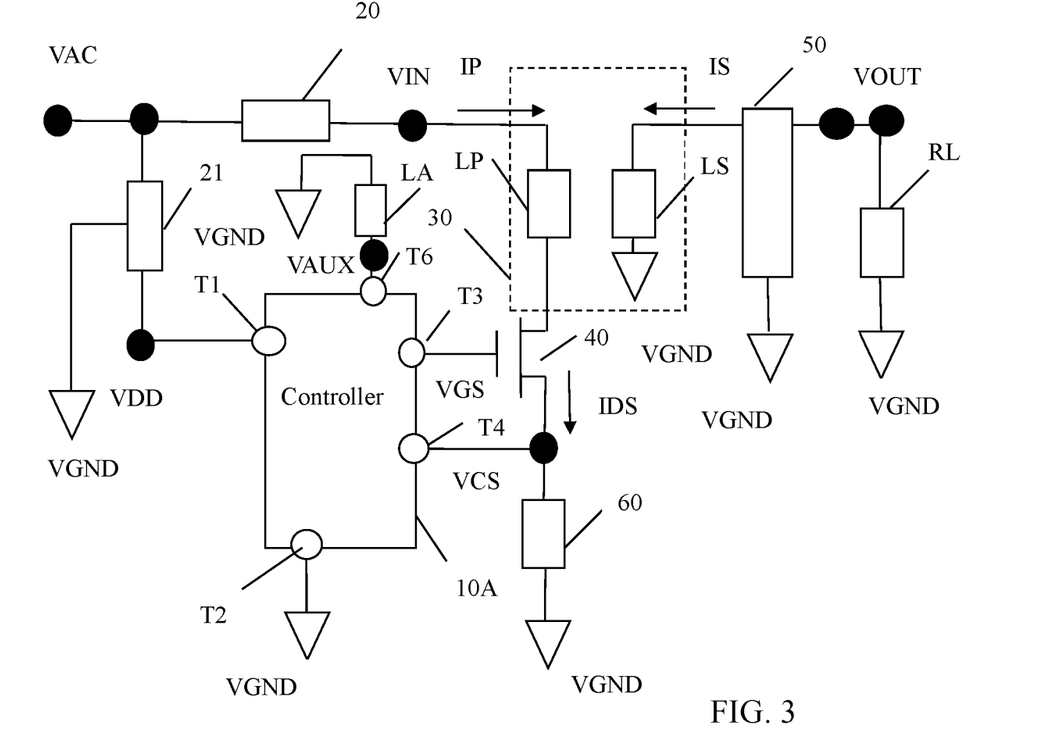
FIG. 3 is a view showing the variable-frequency power controller according to the second embodiment of the present invention.

Further refer to FIG. 3 illustrating the variable-frequency power controller according to the second embodiment of the present invention. As shown in FIG. 3, the variable-frequency power controller 10A according to the second embodiment of the present invention is in collocation with a rectification unit 20, a power unit 21, an inductor unit 30, a switch unit 40, an output unit 50, a current sensing unit 60, and an auxiliary winding LA to implement a variable-frequency power control of power conversion, and substantially comprises a power pin T1, a ground pin T2, a driving pin T3, a voltage sensing pin T4, and an auxiliary winding sensing pin T6. It should be noted that the second embodiment is similar to the first embodiment, and one difference is that the second embodiment is in collocation with the auxiliary winding LA instead of the loading voltage sensing unit 70, and the second embodiment is provided with the auxiliary winding sensing pin T6 to replace the loading voltage sensing pin T5. Thus, the other elements are not described in detail hereinafter.

Specifically, the auxiliary winding sensing pin T6 of the variable-frequency power controller 10A is connected to the ground level VGND through the auxiliary winding LA, and the auxiliary winding LA is intended to form a primary side feedback loop. Further, the auxiliary winding LA is coupled with the primary side winding LP and the secondary side winding LS for generating an auxiliary winding voltage VAUX, which is received by the variable-frequency power controller 10A through the auxiliary winding sensing pin T6. The auxiliary winding voltage VAUX is employed to represent the loading level for the load RL and serves as the loading sensing voltage just like the loading sensing voltage VCOMP in the first embodiment. Thus, the scheme of sensing the auxiliary winding voltage VAUX in the second embodiment is substantially different from the scheme of sensing the loading sensing voltage VCOMP to form a secondary side feedback loop with the loading voltage sensing unit 70 in the first embodiment. Since the auxiliary winding LA employed to form the primary side feedback loop is well known in a traditional flyback power converter, the related description is omitted hereinafter.

Similar to the variable-frequency power control performed by the variable-frequency power controller 10 in the first embodiment, the second embodiment employs the variable-frequency power controller 10A to perform the variable-frequency power control. In other words, the variable-frequency power controller 10A of the second embodiment performs the variable-frequency power control as shown in FIG. 2, and the auxiliary winding voltage VAUX is used to replace the loading sensing voltage VCOMP for determining the loading level and adjusting the PWM frequency Fsw, thereby improving efficiency of power conversion, reducing switching loss, and particularly coping with the instantaneous peak loading like powering on. As a result, malfunction of stopping operation is prevented. In addition, the first loading voltage V1, the second loading voltage V2, the third loading voltage V3, the fourth loading voltage V4, the first frequency F1, the second frequency F2, the third frequency F3, and the fourth frequency F4 in the second embodiment are well described in the first embodiment, and the related aspects are thus not mentioned hereinafter.

From the above mention, one aspect of the first embodiment according to present invention is that the variable-frequency power control of power conversion performed by the variable-frequency power controller comprises the burst mode, valley switch mode, quasi-resonance (QR) mode, conduction mode, and peak loading mode to cover a wide range of loading level including ultra-light, light, middle, full, and even over-heavy loading like peak loading, and the features of power saving, low switching loss, operation safety are thus achieved. Further, any over design employed to meet the wide range of loading level is also prevented and operation safety is still assured.

Another aspect of the first embodiment according to present invention is that the operation modes are optimally selected according to the external input power, thereby achieving the best performance to meet various applications.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A variable-frequency power controller in collocation with a rectification unit, a power unit, an inductor unit, a switch unit, an output unit, a current sensing unit, and a loading voltage sensing unit to implement a variable-frequency power control of power conversion, the switch unit comprising a Metal-Oxide-Semiconductor (MOS) transistor, a Gallium Nitride field effect transistor (GaN FET), or a silicon carbide (SiC)-MOSFET, the inductor unit comprising at least one winding, the variable-frequency power controller comprising:

a power pin connected to the power unit for receiving an input power to operate;
a ground pin connected to a ground level;
a driving pin connected to a gate of the switch unit;
a voltage sensing pin connected to a source of the switch unit and an end of the current sensing unit, another end of the current sensing unit connected to the ground level and generating a current sensing voltage; and
a loading voltage sensing pin connected to the loading voltage sensing unit,
wherein the rectification unit receives and converts an external input power into a rectification power, the power unit receives the external input power to generate the input power through regulation, the inductor unit comprises a primary side winding and a secondary side winding coupled to each other for providing a function of transformer, an end of the primary side winding is connected to the rectification unit for receiving the rectification power, another end of the primary side winding is connected to a drain of the switch unit, an end of the current sensing unit is connected to the source of the switch unit, another end of the current sensing unit is connected to the ground level, the output unit is connected to an end of the secondary side winding for generating the output power to supply a load connected to the output unit, another end of the secondary side winding is connected to the ground level, the loading voltage sensing unit is connected to the output unit for receiving the output power and generating a loading sensing voltage, the variable-frequency power controller generates and transfers a driving signal to the driving pin for driving the switch unit to turn on or off, the driving signal is substantially a pulse width modulation (PWM) signal with a variable PWM frequency, the variable-frequency power controller has a first loading voltage, a second loading voltage, a third loading voltage, and a fourth loading voltage preset for comparing the loading sensing voltage to determine a loading level, the first loading voltage is less than the second loading voltage, the second loading voltage is less than the third loading voltage, the third loading voltage is less than the fourth loading voltage, and the variable-frequency power control performed by the variable-frequency power controller to adjust the PWM frequency based on the loading level comprises:

the variable-frequency power controller entering a burst mode, the loading level considered as ultra-light loading, and the PWM frequency kept to a first frequency if the loading sensing voltage is not higher than the first loading voltage;

the variable-frequency power controller entering a valley switch mode, the loading level considered as light loading the PWM frequency increased to a second frequency from the first frequency as the loading sensing voltage increases, the second frequency being greater than the first frequency, and the switch unit being turned on after a preset number of valleys if the loading sensing voltage is higher than the first loading voltage and not higher than the second loading voltage;

the variable-frequency power controller entering a quasi-resonance (QR) mode, the loading level considered as middle loading, the PWM frequency decreased to a third frequency from the second frequency, and the third frequency being between the first frequency and the second frequency if the loading sensing voltage is higher than the second loading voltage and not higher than the third loading voltage;

the variable-frequency power controller entering a conduction mode, the loading level considered as full loading, and the PWM frequency kept to the third frequency if the loading sensing voltage is higher than the third loading voltage and not higher than the fourth loading voltage; and the variable-frequency power controller entering a peak loading mode, the loading level considered as over-heavy loading, the PWM frequency increased to a fourth frequency from the third frequency as the loading sensing voltage increases, and the fourth frequency being greater than the third frequency if the loading sensing voltage is higher than the fourth loading voltage.

2. The variable-frequency power controller as claimed in claim 1, wherein the conduction mode is selected by the variable-frequency power controller from one of a continuous conduction mode (CCM) and a discontinuous conduction mode (DCM).

3. The variable-frequency power controller as claimed in claim 1, wherein the preset number of valley is preset by the variable-frequency power controller.

4. The variable-frequency power controller as claimed in claim 3, wherein the peak loading mode lasts for a peak loading operation time preset, then the driving signal is stopped, and the peak loading mode is re-performed after a peak loading stop time preset.

5. The variable-frequency power controller as claimed in claim 1, wherein the QR mode is replaced by the conduction mode if the external input power is 90-180 Vac; and the conduction mode and the peak loading mode is replaced by the QR mode if the external input power is 180-270 Vac, or alternatively, the peak loading mode is replaced by the conduction mode if the external input power is 180-270 Vac.

6. A variable-frequency power controller in collocation with a rectification unit, a power unit, an inductor unit, a switch unit, an output unit, a current sensing unit, and an auxiliary winding sensing unit to implement a variable-frequency power control of power conversion, the switch unit comprising a Metal-Oxide-Semiconductor (MOS) transistor, a Gallium Nitride field effect transistor (GaN FET), or a silicon carbide (SiC)-MOSFET, the inductor unit comprising at least one winding, the variable-frequency power controller comprising:

a power pin connected to the power unit for receiving an input power to operate;

a ground pin connected to a ground level;

a driving pin connected to a gate of the switch unit;

a voltage sensing pin connected to a source of the switch unit and an end of the current sensing unit, another end of the current sensing unit connected to the ground level and generating a current sensing voltage; and an auxiliary winding sensing pin connected to the ground level through the auxiliary winding sensing unit, wherein the rectification unit receives and converts an external input power into a rectification power, the power unit receives the external input power to generate the input power through regulation, the inductor unit comprises a primary side winding and a secondary side winding coupled to each other for providing a function of transformer, an end of the primary side winding is connected to the rectification unit for receiving the rectification power, another end of the primary side winding is connected to a drain of the switch unit, an end of the current sensing unit is connected to the source of the switch unit, another end of the current sensing unit is connected to the ground level, the output unit is connected to an end of the secondary side winding for generating the output power to supply a load connected to the output unit, another end of the secondary side winding is connected to the ground level, the auxiliary winding sensing unit is coupled to the primary side winding and the secondary side winding for generating an auxiliary winding voltage through induction with a primary side voltage of the primary side winding and a secondary side voltage of the secondary side winding, the auxiliary winding voltage serves as a loading sensing voltage corresponding to a loading level of the load, and is received by the auxiliary winding sensing pin, the variable-frequency power controller generates and transfers a driving signal to the driving pin for driving the switch unit to turn on or off, the driving signal is substantially a pulse width modulation (PWM) signal with a variable PWM frequency, the variable-frequency power controller has a first loading voltage, a second loading voltage, a third loading voltage, and a fourth loading voltage preset for comparing the loading sensing voltage to determine the loading level, the first loading voltage is less than the second loading voltage, the second loading voltage is less than the third loading voltage, the third loading voltage is less than the fourth loading voltage, and the variable-frequency power control performed by the variable-frequency power controller to adjust the PWM frequency based on the loading level comprises:

the variable-frequency power controller entering a burst mode, the loading level considered as ultra-light loading, and the PWM frequency kept to a first frequency if the loading sensing voltage is not higher than the first loading voltage;

the variable-frequency power controller entering a valley switch mode, the loading level considered as light loading the PWM frequency increased to a second frequency from the first frequency as the loading sensing voltage increases, the second frequency being greater than the first frequency, and the switch unit being turned on after a preset number of valleys if the loading sensing voltage is higher than the first loading voltage and not higher than the second loading voltage;

the variable-frequency power controller entering a quasi-resonance (QR) mode, the loading level considered as middle loading, the PWM frequency decreased to a third frequency from the second frequency, and the third frequency being between the first frequency and the second frequency if the loading sensing voltage is higher than the second loading voltage and not higher than the third loading voltage;

the variable-frequency power controller entering a conduction mode, the loading level considered as full loading, and the PWM frequency kept to the third frequency if the loading sensing voltage is higher than the third loading voltage and not higher than the fourth loading voltage; and the variable-frequency power controller entering a peak loading mode, the loading level considered as over-heavy loading, the PWM frequency increased to a fourth frequency from the third frequency as the loading sensing voltage increases, and the fourth frequency being greater than the third frequency if the loading sensing voltage is higher than the fourth loading voltage.

7. The variable-frequency power controller as claimed in claim 6, wherein the conduction mode is selected by the variable-frequency power controller from one of a continuous conduction mode (CCM) and a discontinuous conduction mode (DCM).

8. The variable-frequency power controller as claimed in claim 6, wherein the preset number of valley is preset by the variable-frequency power controller.

9. The variable-frequency power controller as claimed in claim 6, wherein the peak loading mode lasts for a peak loading operation time preset, then the driving signal is stopped, and the peak loading mode is re-performed after a peak loading ing stop time preset.

10. The variable-frequency power controller as claimed in claim 6, wherein the QR mode is replaced by the conduction mode if the external input power is 90-180 Vac; and the conduction mode and the peak loading mode is replaced by the QR mode if the external input power is 180-270 Vac, or alternatively, the peak loading mode is replaced by the conduction mode if the external input power is 180-270 Vac.

* * * * *